United States Patent
Fayt et al.

(10) Patent No.: US 7,506,919 B2
(45) Date of Patent: Mar. 24, 2009

(54) BUMPER SHIELD FOR A MOTOR VEHICLE CONSTITUTED BY A SKIN AND OPEN-WORKED AND METHOD FOR ASSEMBLY OF SUCH A SHIELD ON A VEHICLE FRAME

(75) Inventors: Arnold Fayt, Jujurieux (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 135 days.

(21) Appl. No.: 11/184,254

(22) Filed: Dec. 30, 2005

(65) Prior Publication Data

US 2006/0108836 A1    May 25, 2006

(30) Foreign Application Priority Data

Jul. 19, 2004    (FR)    .................................... 04 07983

(51) Int. Cl.
    *B60R 27/00*    (2006.01)
(52) U.S. Cl. .............. 296/193.09; 293/102; 296/203.02
(58) Field of Classification Search ............ 296/193.09, 296/203.02; 293/102
    See application file for complete search history.

(56) References Cited

U.S. PATENT DOCUMENTS

| 6,357,821 B1 | 3/2002 | Maj et al. | |
| 6,880,882 B2 * | 4/2005 | Andre et al. | ........... 296/193.09 |
| 2002/0073529 A1 | 6/2002 | Yustick | |

* cited by examiner

*Primary Examiner*—Lori L Lyjak
(74) *Attorney, Agent, or Firm*—Robert L. Epstein; Epstein Drangel Bazerman & James, LLP

(57) ABSTRACT

A bumper shield is constituted by an outer skin and an inner skin lining. The skin lining is capable on its own of carrying light units, enabling the shield to be mounted in two stages. A method of mounting such a shield.

5 Claims, 2 Drawing Sheets

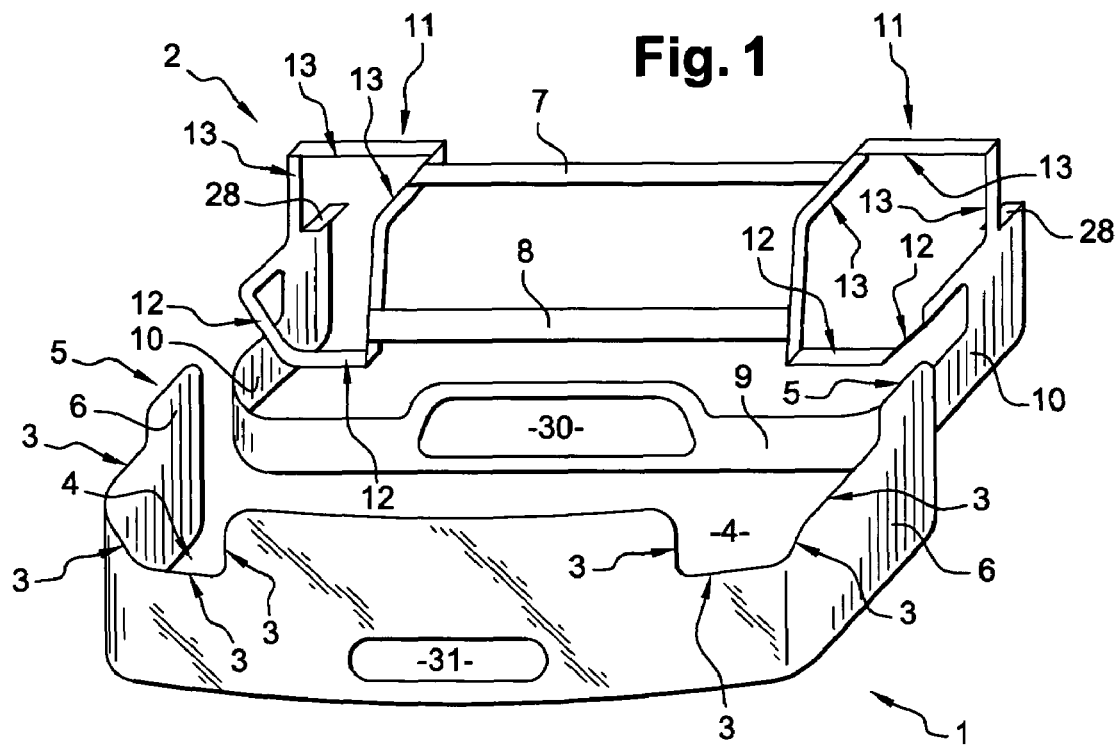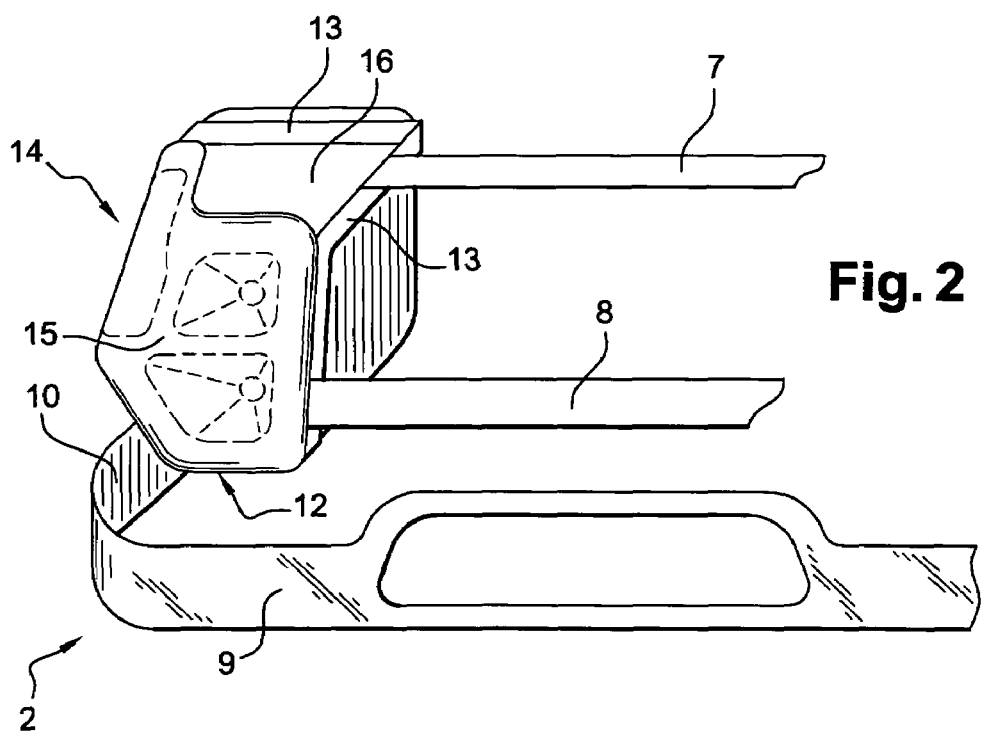

BUMPER SHIELD FOR A MOTOR VEHICLE CONSTITUTED BY A SKIN AND OPEN-WORKED AND METHOD FOR ASSEMBLY OF SUCH A SHIELD ON A VEHICLE FRAME

The present invention relates to a motor vehicle bumper shield constituted by a skin and by a skin lining, and to a method of mounting such a shield on a motor vehicle.

BACKGROUND OF THE INVENTION

Document EP 1 352 811 discloses a front bodywork assembly for a motor vehicle constituted by light units, a shield, and a reinforcement carrying the light units, those component elements of the bodywork assembly being united away from the vehicle assembly line, and the assembly being fitted as a one-piece to the front of the vehicle in order to be put into position relative to the front fenders and then secured to the structure of the vehicle by assembly fasteners.

Such an assembly presents the advantage of guaranteeing that the shield is accurately positioned relative to the light, and then the shield and the light units are accurately positioned relative to the fenders.

However, it presents the drawback of making it difficult to access the fasteners for mounting the assembly to the structure, said fasteners possibly including supports for the light units and fasteners for mounting the shield on the structure.

OBJECTS AND SUMMARY OF THE INVENTION

The present invention seeks to propose a solution that retains the advantage of the shield, the light units, and the fenders being accurately positioned relative to one another, while making it easier to fasten those parts to the structure of the vehicle, and also, where appropriate, to fasten supports for the light units to the structure of the vehicle.

More generally, the invention seeks to make it easier to mount a shield and to put it accurately into position relative to any adjacent visible part to said shield.

To this end, the present invention provides a motor vehicle bumper shield for putting accurately into position relative to light units and adjacent visible parts to said shield, and designed to be mounted on the structure of a motor vehicle by mounting fasteners, wherein the shield is constituted by an outer skin, an inner skin lining, and means for fastening the skin on the skin lining, and wherein:

the skin includes reference points relative to the light units and to the adjacent visible parts;

the lining includes positioning points relative to the light units and/or to the adjacent visible parts;

the lining includes supports to support alone the light units appropriately positioned relative to the positioning points;

the lining is shaped in such a manner as to allow access to the mounting fasteners on the vehicle structure when the lining carrying the light units is presented in front of the vehicle structure; and the means for fastening the skin on the skin lining are arranged to insure that the reference points on the skin are superposed with the positioning points of the skin lining.

The bumper shield of the present invention presents the advantage of splitting into an outer skin and an inner skin lining, and thus, of being capable of being mounted on the motor vehicle in two stages.

In a first stage, the skin lining, together with the light units, constitutes a one-piece assembly which is fitted to the vehicle like the one-piece bodywork assembly of the prior art, thus ensuring that the skin lining is accurately positioned relative to the light units, and then that the skin lining and the light units are accurately positioned relative to the adjacent visible parts, e.g. the fenders.

The assembly presented in front of the vehicle can easily be fastened to the structure of the vehicle because the mounting fasteners on the structure remain accessible through the skin lining. Similarly, any supports for the light units provided between the structure and the light units can easily be secured to the light units and to the structure.

In a second stage, the outer skin is fitted on the skin lining and the means for fastening the skin on the lining ensure that the skin is properly positioned by superposing reference points of the skin on positioning points of the skin lining, which have themselves previously been put accurately into position relative to the light units and to the adjacent visible parts.

As a result the outer skin is accurately positioned relative to the light units and to the adjacent visible parts, and the bodywork assembly can be mounted on the motor vehicle easily without any difficulty in accessing the mounting fasteners.

The present invention provides the additional advantage in that, since the shield is split between an outer skin and an inner skin lining, the skin and the lining can each present thickness that is smaller than the thickness of the corresponding shield, thereby making them more flexible and, consequently, easier to adapt in shape while they are being mounted on the motor vehicle.

In addition, the skin lining can perform other functions such as acting as a support for members, e.g. fog lights or radars, or as reinforcements against blistering, improving the ability of the outer skin to withstand light pressure applied by a user.

In a particular embodiment of the invention, the skin is perforated so as to allow it to be fastened on the skin lining and/or on other bodywork parts in the vicinity. In certain circumstances, shutters in the form of protective strips cover the perforations in the skin after it has been fastened.

The present invention also provides a method of mounting a shield as described above onto a motor vehicle structure, the method comprising the following steps:

positioning and fastening light units on the skin lining;

presenting the skin lining carrying the light units in front of the vehicle;

positioning the skin lining and the light units relative to the adjacent visible parts;

fastening the lining on the structure and optionally fastening supports for the light units between the structure and the light units; and presenting and fastening the skin on the skin lining, the reference points of the skin being superposed with the positioning points of the skin lining.

In another implementation, the skin lining is initially presented on its own in front of the vehicle, it is positioned relative to the adjacent visible parts, and then the light units are fastened to the skin lining.

BRIEF DESCRIPTION OF THE DRAWINGS

The present invention will be better understood on reading the following description of an embodiment given by way of an example that does not limit the scope of the invention, and with reference to the accompanying drawings, in which:

FIG. 1 is an exploded perspective view of a shield constituted by a skin and a skin lining in an embodiment of the invention;

FIG. 2 is a perspective view of a portion of the skin lining carrying a light unit;

DETAILED DESCRIPTION OF THE DRAWINGS

Figure 3:
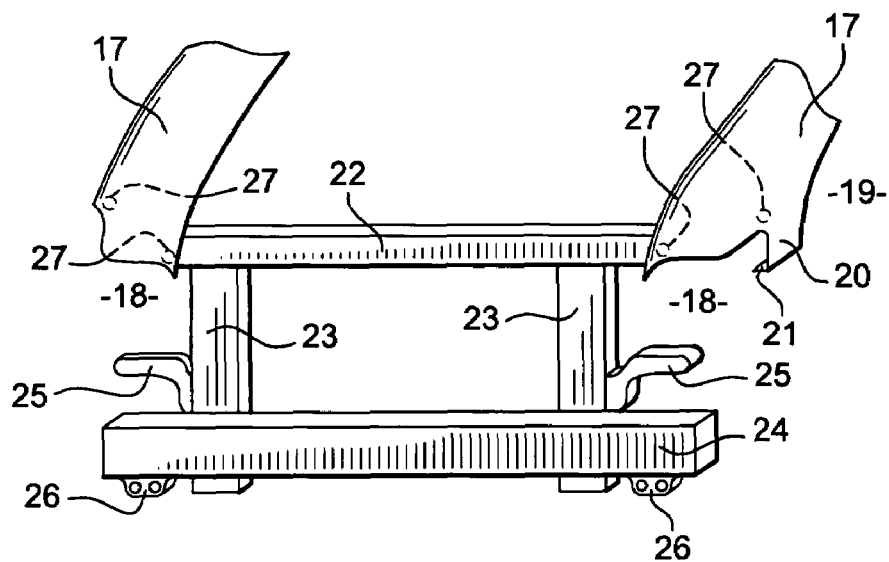
FIG. 3 is a perspective view of the front of a motor vehicle.

FIG. 1 shows a bumper shield constituted by an outer skin 1 and by an inner lining 2, both made of polypropylene.

The outer skin is covered in decorative paint, whereas the lining which is not designed to be seen from outside of the vehicle is not painted.

The skin has reference points relative to the light units and relative to the fenders.

Relative to the light units, the reference points are constituted by edges 3 and two notches 4 situated in the top portions of the corners of the skin.

Relative to the fenders, the reference points are constituted by rear top rims 5 of the projections 6 of the skin.

By definition, the reference points, constituted in this case by the reference edges 3 and 5, are portions of the skin that must be accurately positioned relative to the parts that are adjacent thereto, namely firstly the light units and secondly the fenders.

The lining 2 is shaped to match the inside shape of the skin.

It has a front face 9 with a central portion that includes an opening 30 coinciding with an opening 31 provided in the skin 6. The front face 9 is extended at each of its ends by side faces 10 for pressing against the projections 6 of the skin.

The top rear end of each side face 10 of the lining includes a edge 28 which constitutes a point for positioning the lining 2 relative to a fender.

The lining further includes supports 11 to support alone light units (not shown in FIG. 1).

Each support 11 is constituted by a structure having bottom edges 12 constituting points for positioning the lining 2 relative to the light units.

Each structure constituting a light unit support is thus dimensioned so as to carry the light unit and hold it with its glass 15 appropriately positioned relative to the reference edges 12.

Finally, the lining has two cross-members 7 and 8 set back from the front face 9 and interconnecting the two structures 11.

In FIG. 2, there can be seen a light unit 14 whose glass 15 is appropriately positioned relative to the reference edges 12. The lining alone carries both light units while it is being mounted on the vehicle.

FIG. 3 shows the front of a motor vehicle having two front fenders 17, each of which includes a notch 18 in its front corner for the purpose of receiving a light unit, and between the notch 18 and a wheel arch 19, a stub 20 having an inside edge 21 for connection with the rear top edge 5 of the corresponding projections 6 of the bumper skin.

The front of the vehicle also includes a top cross-member 22 and vertical legs 23 carried by the side rails (not shown) of the vehicle, and also a bumper cross-member 24 likewise fastened to the side rails. The parts 22, 23, and 24 are considered as belonging to the structure of the vehicle.

Each leg 23 may also receive a bracket 25 for supporting a corresponding light unit 14, as shown in FIG. 3, but for putting into place only after the lining has been fastened, unless the bracket is suitable for being repositioned on the leg.

Finally, the bumper cross-member 24 carries tabs 26 for fastening the shield lining.

Figure 4:
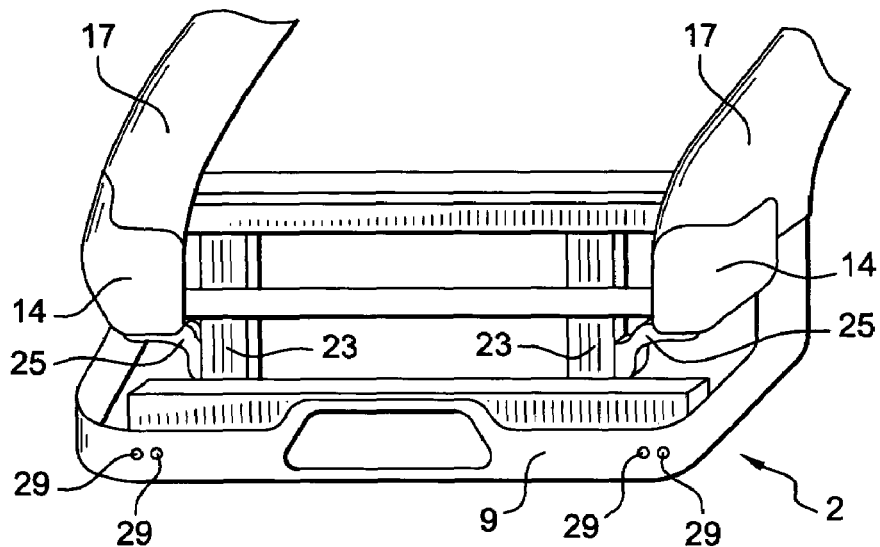
FIG. 4 is a view analogous to FIG. 3 after the lining carrying the light units has been fitted on the vehicle.

FIG. 4 shows the front of the vehicle after the lining 2 carrying the light units 14 has been fitted on the vehicle.

While the lining 2 is put into place on the vehicle, the structures 11 take up positions relative to the fenders 17 by bearing the reference points of the fenders 17 directly against the structures. For this purpose, positioning studs are provided on the inside face of the fender at locations 27 drawn in dashed lines in FIG. 3. These studs penetrate into notches or orifices (not shown) formed in the structures and serving to position the lining relative to the fenders.

The front face 9 of the lining is also fastened to the fastening tabs 26 by means of rivets 29.

It should be observed that while the lining 2 is being put into place on the vehicle, it can deform slightly to adapt to the specific geometrical shape of the vehicle, and in particular to the spacing between its fenders 17. Similarly, the fenders 17 can deform slightly so as to make it easier to position the lining 2 properly.

FIG. 4 shows that after the lining has been fitted, it leaves free access to the positioning points 12 and 28 and also to the rivets 29 of the front face 9 on the bumper cross-member 24, thereby making it easier to fasten the lining 2 on the vehicle.

In addition, the lining also leaves access free to the legs 23, which makes it possible to install or reposition the bracket 25 for supporting the light units 14.

Figure 5:
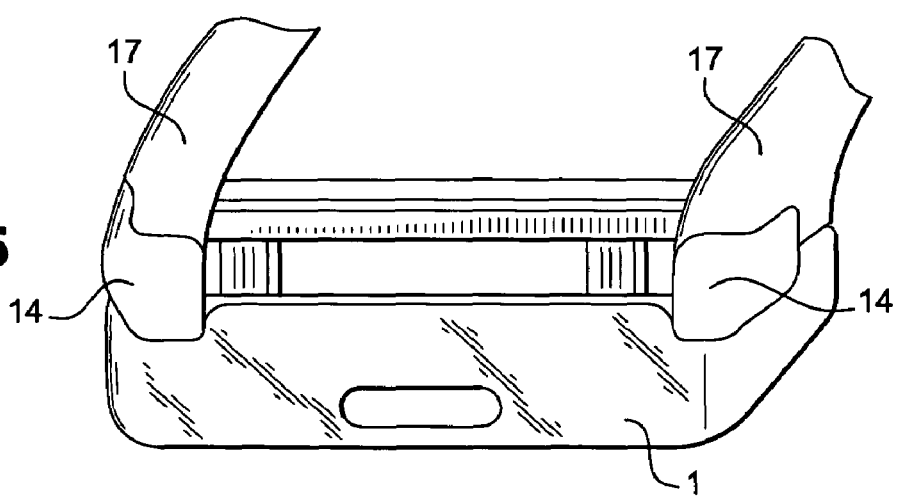
FIG. 5 is a view analogous to FIG. 4 after the skin has been fitted on the lining.

Once the lining 2 is in place and the support brackets 25 have been fastened, it only remains to fit the skin 1 on the lining 2, as shown in FIG. 5.

The skin 1, which is deformable, adapts to the geometrical shape taken on by the lining 2 while it was being put into place on the vehicle. The reference edges 3 of the skin 1 come to press against the positioning edges 12 of the lining 2. Similarly, the reference edges 5 become superposed on the positioning edges 28 of the lining 2, thereby ensuring that the skin 1 is accurately positioned both relative to the light units and relative to the fenders 17.

It can be seen that because of the invention, the positioning and the fastening of the lining, both to the fenders and to the structure of the vehicle, and also the positioning of the light units support brackets, are made easier by the absence of the skin, and that adding the skin subsequently benefits from accurate positioning because of the presence of reference and positioning points on the skin and on its lining.

Naturally the embodiment of the invention described above is not limiting in any way and could be modified in any desirable manner without thereby going beyond the ambit of the invention.

In particular, although the description relates only to accurate positioning relative to the fenders, the invention applies to positioning the shield accurately relative to all of the adjacent visible parts to the shield, and in particular the hood or the grille of the vehicle.

What is claimed is:

1. A motor vehicle bumper shield for use on the structure of a motor vehicle for putting accurately into position relative to light units and adjacent visible parts to said motor vehicle bumper shield, and designed to be mounted on the structure of the motor vehicle by mounting fasteners, wherein the motor vehicle bumper shield is constituted by an outer skin, an inner skin lining, and means for fastening the outer skin on the inner skin lining, and wherein:

the outer skin includes reference points relative to the light units and to the adjacent visible parts;

the inner skin lining includes positioning points relative to the light units or to the adjacent visible parts;

the inner skin lining includes supports to support alone the light units appropriately positioned relative to the positioning points;

the inner skin lining is shaped in such a manner as to allow access to the mounting fasteners on the structure of the motor vehicle when the inner skin lining carrying the light units is presented in front of the structure of the motor vehicle; and the means for fastening the outer skin on the inner skin lining are arranged to insure that the reference points on the outer skin are superposed with the positioning points of the inner skin lining.

2. A motor vehicle bumper shield according to claim 1, in which the inner skin lining serves as a support for members, or as reinforcements against indentation, improving the ability of the outer skin to withstand light pressure applied by a user.

3. A motor vehicle bumper shield according to claim 1, in which the outer skin is perforated so as to allow it to be fastened on the inner skin lining or on other bodywork parts in the vicinity.

4. A method of mounting the motor vehicle bumper shield according to claim 1 onto the structure of a motor vehicle, the method comprising the following steps:

positioning and fastening light units on the inner skin lining;

presenting the inner skin lining carrying the light units in front of the vehicle;

positioning the inner skin lining and the light units relative to the adjacent visible parts;

fastening the inner skin lining on the structure of the motor vehicle and optionally fastening supports for the light units between the structure of the motor vehicle and the light units; and presenting and fastening the outer skin on the inner skin lining, the reference points of the outer skin being superposed with the positioning points of the inner skin lining.

5. A method of mounting the motor vehicle bumper shield according to claim 1 on the structure of the motor vehicle, the method comprising the following steps:

presenting the inner skin lining in front of the vehicle;

positioning the inner skin lining relative to the adjacent visible parts;

fastening the inner skin lining on the structure of the motor vehicle;

positioning and fastening light units on the inner skin lining;

optionally fastening supports for the light units between the structure of the motor vehicle and the light units; and presenting and fastening the outer skin on the inner skin lining, the reference points of the outer skin being superposed with the positioning points of the inner skin lining.

\* \* \* \* \*